United States Patent
Hsu et al.

(10) Patent No.: US 12,303,826 B2
(45) Date of Patent: May 20, 2025

(54) DEVICE AND METHOD FOR CLEANING A GAS STREAM

(71) Applicant: DAS Environmental Expert GmbH, Dresden (DE)

(72) Inventors: Chang-Guo Hsu, Hsinchu (TW); Ting-Hao Lai, Toufen (TW); Ching-Pin Chen, Hsinchu (TW); Ying-Liang Chen, Zhubei (TW)

(73) Assignee: DAS Environmental Expert GmbH, Dresden (DE)

( * ) Notice: Subject to any disclaimer, the term of this patent is extended or adjusted under 35 U.S.C. 154(b) by 290 days.

(21) Appl. No.: 18/161,942

(22) Filed: Jan. 31, 2023

(65) Prior Publication Data
US 2023/0277978 A1 Sep. 7, 2023

(30) Foreign Application Priority Data
Mar. 7, 2022 (DE) .......................... 102022105258.3

(51) Int. Cl.
*B01D 47/06* (2006.01)
*B01D 47/14* (2006.01)
*B01D 53/18* (2006.01)
*B01F 23/21* (2022.01)
*B01F 23/213* (2022.01)

(52) U.S. Cl.
CPC .......... *B01D 53/185* (2013.01); *B01D 47/06* (2013.01); *B01D 47/14* (2013.01); *B01F 23/2132* (2022.01); *B01D 2247/106* (2013.01); *B01D 2251/304* (2013.01); *B01D 2251/306* (2013.01);
(Continued)

(58) Field of Classification Search
CPC ...... B01F 23/21; B01F 23/213; B01F 23/132; B01F 23/2132; B01D 47/00; B01D 47/06; B01D 47/14
See application file for complete search history.

(56) References Cited

U.S. PATENT DOCUMENTS 4,022,593 A * 5/1977 Lerner ...................... F28C 1/16
55/424
9,700,837 B2 * 7/2017 Laslo ................... B01D 53/504
(Continued)

FOREIGN PATENT DOCUMENTS

DE 102018127371 A1 5/2020
EP 0727247 A1 8/1996
(Continued)

*Primary Examiner* — Robert A Hopkins
(74) *Attorney, Agent, or Firm* — Rogowski Law LLC

(57) ABSTRACT

A device, such as a wet scrubber for cleaning a stream of gas by removing gaseous, liquid and solid impurities, has a gas inlet and a gas outlet. At the gas inlet there is a first structured packing. A spray-scrubber area with atomizing nozzles is provided above the first structured packing. A first demister is provided for separating larger drops above the spray-scrubber area. A woven fabric is above the first demister, and spray nozzles are arranged around this woven fabric to spray washing liquid in the direction of the gas stream onto the surface of the woven fabric. A final demister is located above the woven fabric and has a demister rinsing apparatus. The device may be used to dispose of industrial waste gases encountered in the semiconductor industry, particularly for the disposal of waste gases stemming from CVD processes in microelectronics production.

20 Claims, 3 Drawing Sheets

(52) U.S. Cl.
CPC .................. *B01D 2252/103* (2013.01); *B01D 2258/0216* (2013.01)

(56) References Cited

U.S. PATENT DOCUMENTS

| | | |
|---|---|---|
| 11,504,670 B2 | 11/2022 | Mauch et al. |
| 2005/0123461 A1 | 6/2005 | Frenzel et al. |
| 2008/0271603 A1 | 11/2008 | Triplett et al. |
| 2022/0226770 A1* | 7/2022 | Fujita ................ B01D 53/1475 |

FOREIGN PATENT DOCUMENTS

| | | |
|---|---|---|
| EP | 1533017 A1 | 5/2005 |
| KR | 10-1405166 B | 6/2014 |
| WO | 2008142441 A1 | 11/2008 |
| WO | 2010054175 A2 | 5/2010 |
| WO | 2015067921 A1 | 5/2015 |
| WO | 2020165563 A1 | 8/2020 |

\* cited by examiner

DEVICE AND METHOD FOR CLEANING A GAS STREAM

BACKGROUND OF THE INVENTION

The invention relates to a device for cleaning, especially wet cleaning, a stream of gas, by a process in which gaseous, liquid and solid impurities are removed. In particular, the invention relates to a burner-scrubber waste-gas disposal plant having an improved wet scrubber so that the fine particles generated in the combustion stage can be separated with a higher degree of efficiency than with the prior-art washing segments of an identical or comparable size.

The invention is preferably used in burner-scrubber plants for the disposal of industrial waste gases encountered in the semiconductor industry, particularly for the disposal of waste gases stemming from CVD processes in microelectronics production in which large volumes of ultrafine particles are formed during combustion. This especially refers to epitaxy processes during which large amounts of silicon compounds occur in the industrial waste gas.

Burner-scrubber plants are often employed for purposes of treating or cleaning industrial waste gases stemming from semiconductor production processes. Chemical vapor deposition (CVD) and epitaxy processes emit large quantities of silicon compounds which, during combustion, form very fine solid particles having an aerodynamic diameter <1 μm, typically within the range from 0.2 μm to 0.5 μm. The washing segment arranged downstream from the combustion site serves to wash out particles and soluble gases. However, conventional wet scrubbers exhibit low efficiency for fine particles having a diameter <1 μm. The emitted particles can then become deposited in downstream waste gas lines and cause blockage or be released into the environment.

The aerodynamic diameter is of significance from the standpoint of occupational safety and environmental protection such as, for instance, in order to define size classes for ultrafine grains. When it comes to the measurement technology, the aerodynamic diameters are ascertained by means of time-of-flight mass spectrometers or electric low-pressure impactors (ELPI). The methods and measuring equipment are described in the pertinent reference sources under the above-mentioned keywords.

Normally, wet scrubbers having structured packings in the washing segment(s) are used for particle separation. Even though the use of structured packings with a larger specific surface area and shorter free path lengths translates into a more effective particle separation, the packing density that can be utilized in actual practice is limited by the permissible pressure loss along the washing segment and by the build-up of washing liquid in the structured packing.

For instance, U.S. Pat. Appln. No. 2008/0271603 A1 describes an air-cleaning system having, among other things, a cleaning chamber with an aqueous solution of a reagent which is capable of removing contaminating particles and/or gaseous pollutants out of a gas stream. Moreover, for purposes of particle removal, this system comprises inlet and outlet filters which can separate particles ranging in size from 3μ to 100μ and from 0.3μ to 3μ out of a gas stream.

German patent application DE 10 2018 127 371 A1 relates to a wet scrubber having a compact construction with which solid, liquid and gaseous impurities can be removed, for example, from a stream of waste gas found in the semiconductor industry, wherein the scrubber inside the housing has a bypass channel in order to bridge the path of the gas flow through the at least one washing segment present there.

The state of the art proposes as an alternative solution the combination of a wet scrubber with an electrostatic filter. PCT international application WO 2015 067 921 A1 shows an electrostatic filter that is concentrically arranged with a wet scrubber.

PCT international application WO 2008 142 441 A1 shows an electrostatic filter that is arranged above a washing segment.

PCT international application WO 2020 165 563 A1 discloses a cyclone separator that is arranged on a washing segment. Korean patent specification KR 1405166 B discloses a plasma reactor with a washing segment as well as a cyclone separator for particle separation purposes.

European patent EP 1 533 017 B1 describes the separation of particles in a wet scrubber according to which the particle size is increased to a large volume through agglomeration with a fine mist.

All of the solutions described in the state of the art for separating fine and ultrafine particles out of a stream of gas (waste gas stream) still need improvements. The aimed-for improvements especially relate to the efficiency of the particle separation, to the size of the device necessary for this purpose or of the wet scrubber employed for this, and to the occurring pressure loss along the entire washing segment owing to a high packing density and the build-up of washing liquid in these structured packings.

Before this backdrop, an objective of the present invention is to provide a device and a method with which it is possible to attain an efficient separation of fine and ultrafine particles out of waste gas streams, particularly those that occur in the semiconductor industry, without having to accept the above-mentioned disadvantages known from the state of the art. At the very least, the device and the method should improve particle separation and minimize the cited drawbacks to the greatest extent possible.

This objective is achieved by the device described below, particularly by the improved washing segment that is used in this device, as well as by an appropriately adapted method for cleaning gas streams.

SUMMARY OF THE INVENTION

The inventive device for cleaning a stream of gas, or else the actual gas-cleaning unit, namely, the washing segment according to the invention, is preferably employed downstream from a combustion reactor and from a so-called quenching stage that serves to attain a rapid cooling of the generated waste gas. The task of the quenching stage or quenching element is the rapid cooling of the waste gas down to the requisite temperature. This is mostly done by directly injecting water into the hot stream of gas in order to cool the gas down to the temperature suitable for the downstream cleaning stages.

The washing segment according to the invention or also the entire device which, as the actual cleaning unit, comprises the washing segment according to the invention, preferably has the same height as the washing segments known from the state of the art and used in actual practice, in other words, it can be retrofitted into existing installations consisting of the burner, optionally the quenching element and the cleaning unit/washing segment. Instead of a combustion reactor, the installation can also make use of a reactor with a thermal plasma source or another thermal reactor that serves to oxidize the waste gases (generally known as a burner).

The inventive washing segment (device according to the invention) has at least one structured packing and preferably one or two structured packings. Washing liquid from a tank is distributed over the packing material by means of spray nozzles. A demister is installed downstream from the washing segment. In comparison to prior-art washing segments, the invention makes use of structured packing that is at least 50%, preferably at least 70%, shorter. Above this structured packing, an area is created in the form of a spray scrubber whose spray nozzles generate very fine drops of a second washing liquid where particles then bond with these drops. Above the area of the spray scrubber, a second structured packing can be provided that serves to separate large drops and to uniformly distribute the gas stream. This structured packing is likewise flushed with the first washing solution in order to wash out the separated drops and particles. Of course, the structured packings likewise serve to enlarge the surface area for washing out the gases.

Above the second structured packing, the gas is guided in the horizontal direction and passes through a vertically stretched woven fabric, that is to say, a fiber material whose fibers are oriented essentially crosswise to the gas flow. The woven fabric can be shaped so as to be cylindrical and the axis of the cylinder is oriented vertically. Preferably, the gas passes through the cylinder from the outside towards the interior, wherein the bottom of the cylinder is closed and the gas flows through the upper end of the cylinder into a demisting stage. Spray nozzles are arranged all around the cylinder. The spray nozzles spray the washing liquid in the direction of the gas flow onto the surface of the woven fabric. The spray nozzles are selected in such a way that they ideally spray the complete surface of the woven fabric with washing liquid. The advantage of this arrangement is that the gas flows through the woven fabric without build-up of the washing liquid in this process. Even in the case of a large flow of washing liquid onto the woven fabric, build-up cannot occur since any liquid that cannot penetrate the woven fabric immediately runs off on its surface. As a result, there is no need to regulate the volume of washing liquid. The fine mist drops in which the even smaller particles are bound are then separated in the woven fabric. The washing liquid runs in the woven fabric downwards and washes the separated particles again out of the woven fabric.

DESCRIPTION OF THE DRAWINGS

The invention will be described in greater detail below on the basis of drawings and embodiments, without being limited thereto. The preceding and subsequently described features of the device according to the invention and of the method according to the invention can be freely combined, either individually or with several features, without being associated to a given embodiment.
There is Shown in the Figures.

Elements having the same function are provided with identical reference numerals in FIGS. 1 to 3.

DETAILED DESCRIPTION

Figure 1:
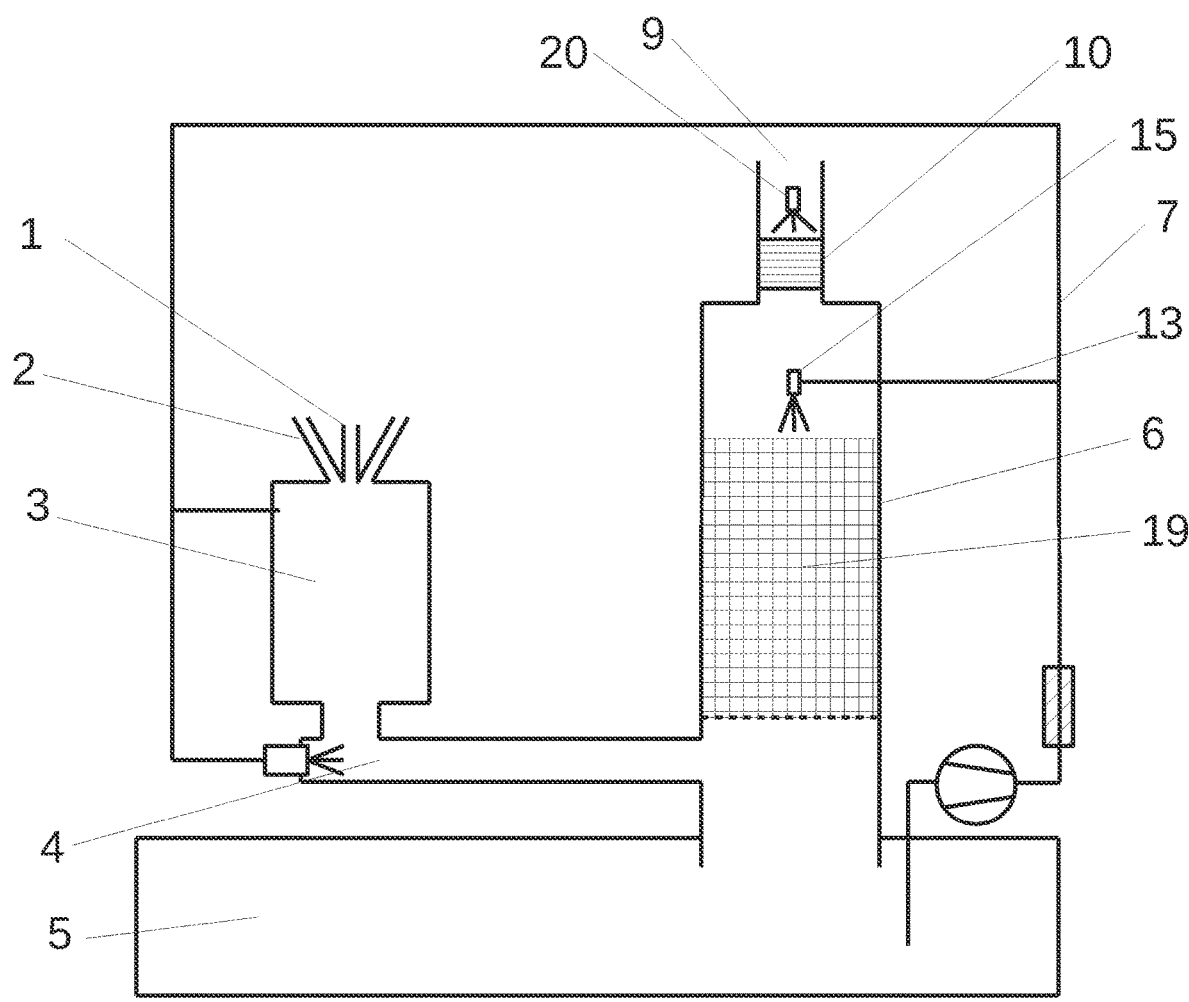
FIG. 1 schematically shows a burner-scrubber installation of the type known from the state of the art. The washing segment (6) to which the present invention relates has a structured packing (19) which is charged with a washing liquid by means of spray nozzles (15), a demister (10) with a demister rinsing apparatus (20) and a gas outlet (9).
Figure 2:
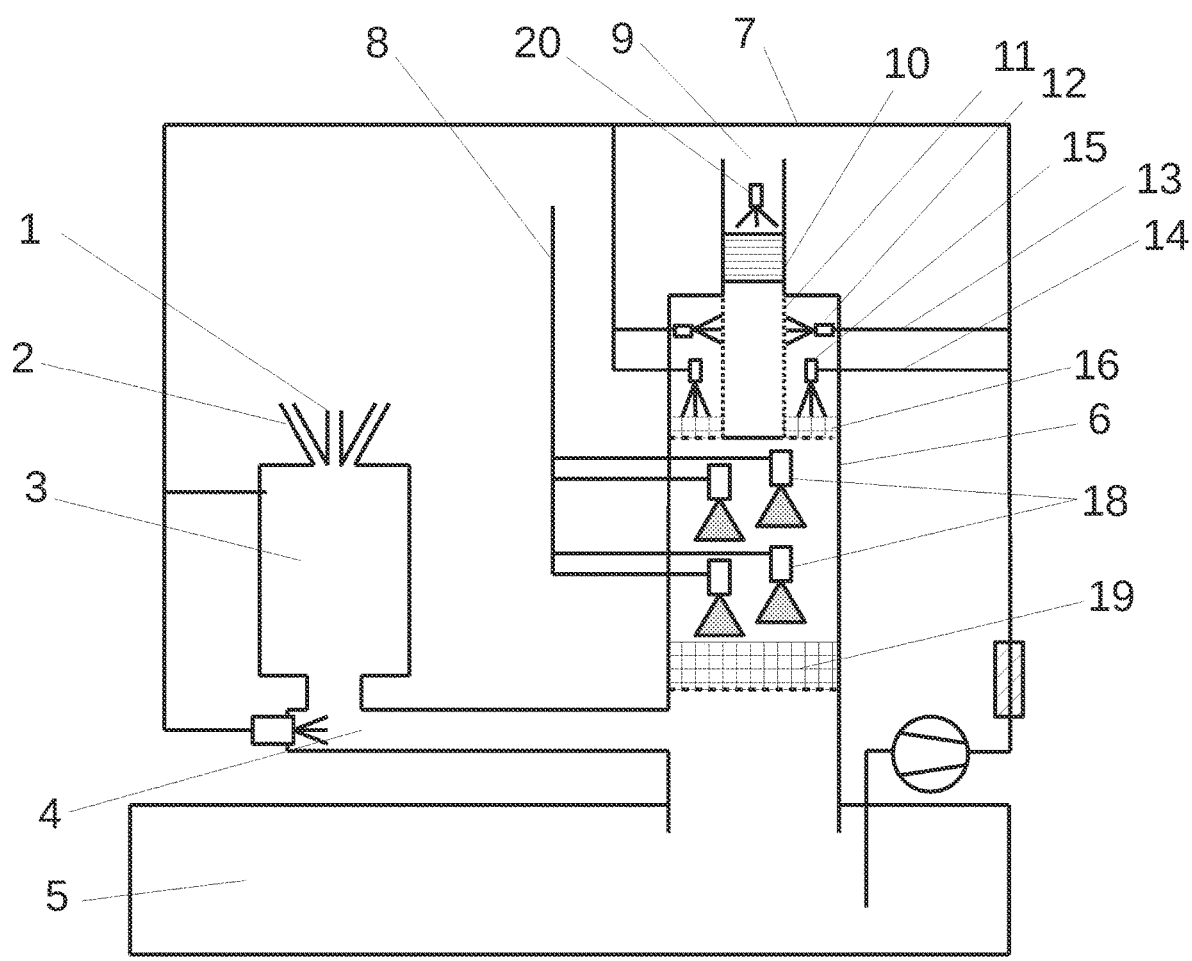
FIG. 2 likewise shows a burner-scrubber installation in which the washing segment (6) is configured as a device according to the invention.
Figure 3:
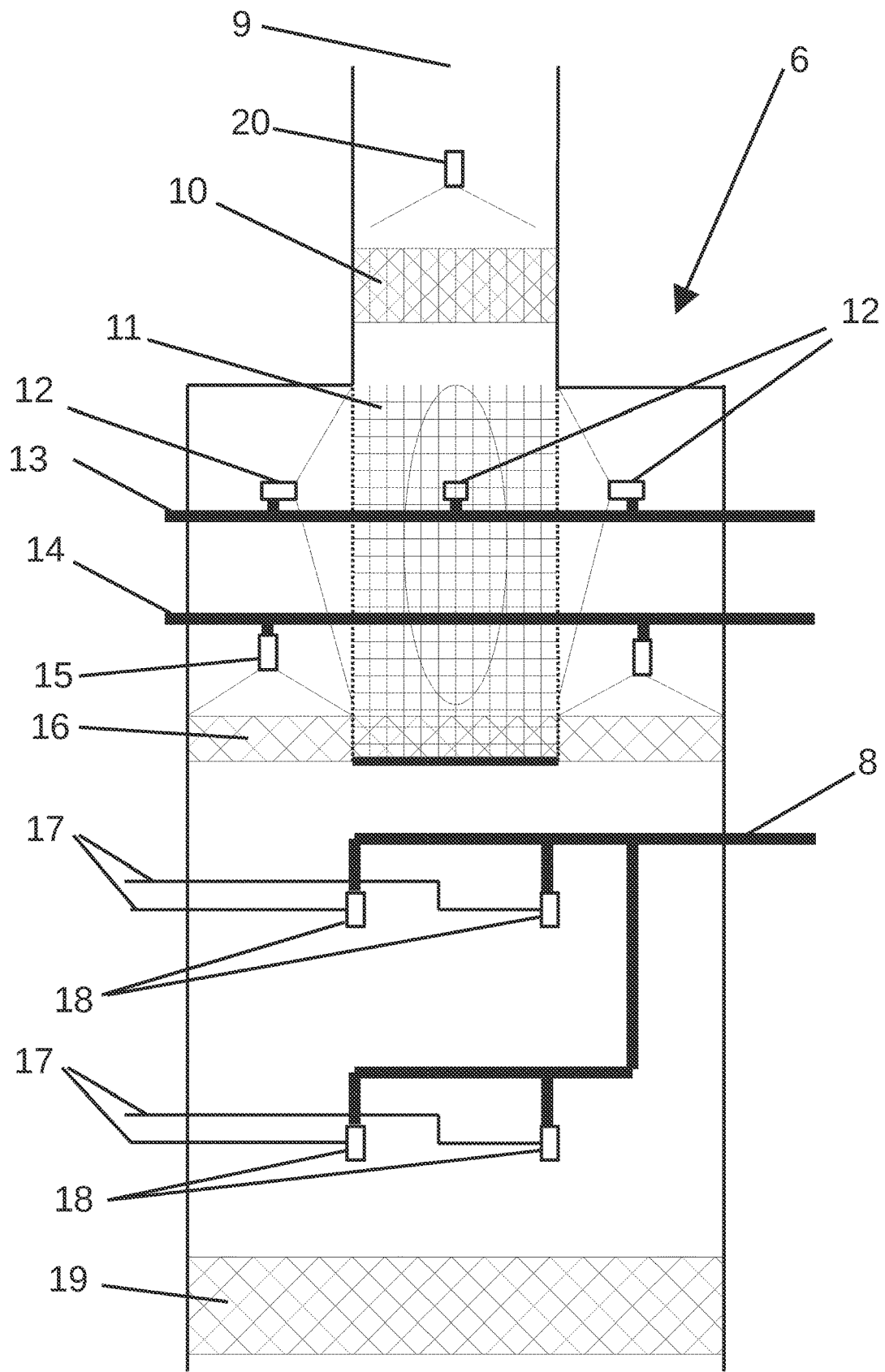
FIG. 3 lastly schematically shows the washing segment or device (6) according to the invention in a preferred embodiment containing additional components.

The washing segment (6) according to the invention or the device (6) according to the invention for cleaning a gas stream preferably has a cylindrical tube which, below a first structured packing (19; not shown here), has an inlet for the gas stream that is to be cleaned. The gas stream comes from a thermal reactor (3) equipped with a burner (1), passes through a quenching zone (4) and then enters the washing segment (=device) through the inlet. The washing segment can have at its bottom an additional opening (not shown here) through which the washing liquid can run off into the tank (5) located underneath.

After entering the washing segment (6), the gas flows upwards through a first structured packing (19). This structured packing (19) preferably consists of a corrosion-proof metallic packed bed and is rinsed by the washing liquids from the areas of the washing segment situated above this structured packing. Preferably, packing bodies having a specific surface area of at least 200 $m^2/m^3$ and a free volume of at least 95% are employed. In the structured packing (19), the gas comes into contact with the washing liquid and the soluble and/or reactive compounds are then washed out. Only a small fraction of very fine particles, that is to say, particles with a diameter of considerably less than 1 μm, are separated in this first structured packing (19).

Above the first structured packing (19), the gas flows through a spray-scrubber area where a washing liquid is atomized to form very fine drops. The liquid is atomized by spray nozzles or atomizing nozzles (18) that can generate liquid drops having a diameter of less than 1 mm, preferably less than 100 μm. These spray nozzles or atomizing nozzles (18) can be configured as two-fluid nozzles which are supplied with washing liquid and compressed air or nitrogen via appropriate feed lines (8, 17).

As an alternative, it is also possible to use high-pressure nozzles which are supplied with the washing liquid by means of a high-output pump with a high initial pressure. In order to prevent the spray nozzles (18) from becoming clogged in this stage with solid particles that might be contained in the recirculating washing liquid, these nozzles (18) are supplied with a second washing liquid, preferably fresh water or particle-free filtered spent water. The spray nozzles are selected and arranged in such a way that the entire cross section of the washing segment is covered with drops so that all of the particles in the gas stream come in close contact with drops and can collide with them. Naturally, the drops also pick up soluble gases.

Above the spray-scrubber area, there is an area for separating the drops and fine particles out of the gas. This area has a first demister (16) for the separation of larger drops. This demister is preferably configured as an additional structured packing (16) having a low height, for example, it is configured as a packed bed having only a few layers of tower packings which are preferably of the same type as in the first structured packing (19). This structured packing (16) is rinsed from above with washing liquid by means of spray nozzles (15) in order to wash out the separated particles and also so as to function as a gas scrubber. This washing liquid can be recirculated out of a washing liquid tank (5). Water, preferably set to an alkaline pH value by means of the addition of a sodium hydroxide solution or a potassium hydroxide solution, is used as the washing liquid.

The gas passes from the bottom to the top through the first demister or through the second structured packing (16) and is then deflected horizontally, after which it flows in the horizontal direction through a woven fabric (11). This woven fabric (11) can be a textile material having a pore size that is considerably smaller than that of the first demister packing. The specific surface area of the woven fabric (11) is preferably greater than 500 m²/m³, especially greater than 1000 m²/m³. The woven fabric (11) is a flat material that is placed in the vertical direction. Examples of suitable materials are those classified as MERV 8 according to ASHRAE 52.5 (American Society of Heating, Refrigerating, and Air Conditioning Engineers) or as M5 according to European Standard EN 779. Washing liquid is continuously sprayed by means of spray nozzles (12) in the direction of the gas flow onto the surface of the woven fabric (11). Some of the liquid or all of it penetrates into the woven fabric (11) and flows downwards in the woven fabric or on its surfaces. As a result, the fine drops and particles that are separated in the woven fabric are continuously washed out. In order to optimize the surface of the woven fabric (11) in the cylindrical washing segment, the woven fabric is placed radially symmetrically on a cylindrical support element (11) in the washing segment. The bottom of the support element is closed so that the gas can only enter via the woven fabric. The upper end of the support element (11) is connected to the entrance of a final demister stage (10). The first demister packing (16) can be configured as a ring around the support element together with the woven fabric. At least three, preferably six, spray nozzles (12) are arranged around the woven-fabric cylinder (11) for purposes of attaining a uniform and complete wetting of the woven fabric. A closed circular line on the exterior or in the interior of the washing segment can serve to ensure a uniform supply of washing liquid to the spray nozzles.

In order to rinse off accumulated solids, the demister stage (10) can additionally be discontinuously charged with additional washing liquid, preferably fresh water, by means of a demister rinsing apparatus (20) installed above in the gas outlet (9).

The specific surface area is defined as the geometric surface of the packing bodies, or as the surface of the fibers or filaments in the volume of the packed bed or of the structured packing. If $A_F$ stands for the surface of the packing bodies or for the surface of the fibers, and $V_S$ stands for the volume of the packed bed or of the structured packing, then the specific surface area is $A_F/V_S$. The free volume is defined as the portion of volume of the packed bed or structured packing that is not filled up by the packing bodies or fibers. If $V_F$ stands for the volume of the packing bodies and $V_S$ stands for the volume of the entire packed bed, then the free volume is defined as $(V_S-V_F)/V_S$. The same applies analogously for fibers or filaments. As a reference source for the use of these parameters (specific area, void fraction), see the definitions presented, for example, in H. T. El-Dessouky et al.: Chemical Engineering and Processing 39 (2000) 129-139.

LIST OF REFERENCE NUMERALS 1 burner
2 noxious gas feed line
3 reactor
4 quenching zone
5 washing liquid tank
6 washing segment
7 washing liquid circulation system
8 feed line for particle-free washing liquid
9 gas outlet
10 demister
11 woven-fabric cylinder/woven fabric
12 spray nozzle
13 feed line for washing liquid
14 feed line for washing liquid
15 spray nozzle
16 second structured packing/demister
17 feed line for compressed air
18 atomizing nozzle
19 first structured packing
20 demister rinsing apparatus

The invention claimed is:

1. A device for cleaning a stream of gas by removing gaseous,
   liquid and solid impurities, including but not limited to fine and ultrafine solid particles, comprising:
   a housing including at least one inner wall;
   a gas inlet;
   a gas outlet;
   a first structured packing at the gas inlet;
   a spray-scrubber area with atomizing nozzles above the first structured packing;
   a first demister for separating larger drops above the spray-scrubber area;
   a hollow woven fabric having a surface, said hollow woven fabric placed above the first demister in a vertical direction with the surface disposed facing the at least one inner wall of the housing;
   two or more spray nozzles arranged around the woven fabric and configured to spray a washing liquid in the direction of the gas stream onto the surface of the woven fabric; and
   a final demister above the woven fabric, said final demister having a demister rinsing apparatus.

2. The device according to claim 1, wherein the first structured packing is charged with a first washing liquid in the form of water containing a sodium hydroxide solution or a potassium hydroxide solution.

3. The device according to claim 1, wherein one or more of the atomizing nozzles of the spray-scrubber area are configured to spray a second washing liquid in the form of water.

4. The device according to claim 1, wherein the atomizing nozzles are configured as two-fluid nozzles which are operated with washing liquid and a gas comprising compressed air or nitrogen.

5. The device according to claim 1, wherein the woven fabric is placed on a cylindrical support element.

6. The device according to claim 5, wherein the woven fabric is a textile material that is placed radially symmetrically on the support element in the form of a woven-fabric cylinder.

7. The device according to claim 5, wherein the support element has a bottom, and the bottom of the support element is closed.

8. The device according to claim 1, wherein the woven fabric has a specific surface area, and the specific surface area of the woven fabric is greater than 500 m²/m³.

9. The device according to claim 1, wherein the gas that is to be cleaned is deflected horizontally above the first demister and then flows in the horizontal direction through the woven-fabric cylinder.

10. The device according to claim 9, wherein the hollow woven fabric is a textile material that is placed radially symmetrically on a support element in the form of a woven-fabric cylinder, and wherein the woven-fabric cylinder has an upper end and a bottom end opposite the upper end, and wherein the upper end of the woven-fabric cylinder is connected to the entrance of the final demister, and at least three spray nozzles are arranged horizontally around the woven-fabric cylinder.

11. A method for cleaning a stream of gas by removing gaseous, liquid and solid impurities, including but not limited to fine and ultrafine solid particles, comprising:
    providing a housing including at least one inner wall;
    directing the gas through a first structured packing at a gas inlet;
    passing the gas through a spray-scrubber area with atomizing nozzles above the first structured packing;
    separating larger drops with a first demister that is above the spray-scrubber area;
    passing the gas through a hollow woven fabric having a surface, said hollow woven fabric placed above the first demister in a vertical direction with the surface disposed facing the at least one inner wall of the housing,
    spraying a washing liquid in the direction of the gas stream onto the surface of the woven fabric with two or more spray nozzles arranged around the woven fabric; and
    separating drops with a final demister above the woven fabric, said final demister having a demister rinsing apparatus.

12. The method of claim 11, wherein the first structured packing is charged with a first washing liquid in the form of water containing a sodium hydroxide solution or a potassium hydroxide solution.

13. The method according to claim 11, wherein one or more of the atomizing nozzles of the spray-scrubber area are configured to spray a second washing liquid in the form of water.

14. The method according to claim 11, wherein the atomizing nozzles are configured as two-fluid nozzles which are operated with washing liquid and a gas comprising compressed air or nitrogen.

15. The method according to claim 11, wherein the hollow woven fabric is placed on a cylindrical support element.

16. The method according to claim 15, wherein the hollow woven fabric is a textile material that is placed radially symmetrically on the cylindrical support element in the form of a woven-fabric cylinder.

17. The method according to claim 15, wherein the cylindrical support element has a bottom, and the bottom of the cylindrical support element is closed.

18. The method according to claim 11, wherein the hollow woven fabric has a specific surface area, and the specific surface area of the hollow woven fabric is greater than 500 $m^2/m^3$.

19. The method according to claim 16, wherein the gas that is to be cleaned is deflected horizontally above the first demister and then flows in the horizontal direction through the woven-fabric cylinder.

20. The method according to claim 19, wherein the woven-fabric cylinder has an upper end and a bottom end opposite the upper end, and wherein the upper end of the woven-fabric cylinder is connected to the entrance of the final demister, and at least three spray nozzles are arranged horizontally around the woven-fabric.

* * * * *